(12) United States Patent
Reeder

(10) Patent No.: US 6,693,922 B1
(45) Date of Patent: *Feb. 17, 2004

(54) REEDER ROD

(75) Inventor: Robin A. Reeder, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,230

(22) Filed: Jan. 13, 2000

(51) Int. Cl.$^7$ .................................................. H01S 3/30
(52) U.S. Cl. ..................... 372/6; 372/105; 372/106; 372/66; 372/69; 372/97; 372/92
(58) Field of Search .......................... 372/39, 27, 66, 372/106, 34, 6, 69, 105, 68, 25

(56) References Cited

U.S. PATENT DOCUMENTS

| | | | |
|---|---|---|---|
| 3,484,714 A | * 12/1969 | Koester et al. | 372/33 |
| 3,617,934 A | * 11/1971 | Segre | 372/105 |
| 3,924,930 A | * 12/1975 | Dwhirst | 359/500 |
| 4,718,766 A | * 1/1988 | Greenstein | 356/350 |
| 4,975,918 A | * 12/1990 | Morton | 372/20 |
| 5,128,956 A | * 7/1992 | Aoki et al. | 372/703 |
| 5,148,445 A | * 9/1992 | Liu et al. | 372/68 |
| 5,272,713 A | * 12/1993 | Sobey et al. | 372/69 |
| 5,473,465 A | * 12/1995 | Ye | 359/246 |
| 5,563,899 A | 10/1996 | Meissner et al. | |
| 5,892,789 A | * 4/1999 | Yasui et al. | 372/68 |
| 6,002,704 A | * 12/1999 | Freitag | 372/94 |
| 6,130,778 A | * 10/2000 | Iwatsuka et al. | 359/497 |
| 6,268,962 B1 | * 7/2001 | Reeder et al. | 359/497 |
| 6,404,537 B1 | * 6/2002 | Melman et al. | 359/323 |
| 6,404,538 B1 | * 6/2002 | Chen et al. | 359/323 |

FOREIGN PATENT DOCUMENTS

| | | |
|---|---|---|
| DE | 196 31 265 | 2/1998 |
| GB | 1 341 272 | 12/1973 |
| JP | 4-06104508 A | * 4/1994 |

* cited by examiner

*Primary Examiner*—Leon Scott, Jr.
(74) *Attorney, Agent, or Firm*—John E. Gunther; Glenn H. Lenzen, Jr.

(57) ABSTRACT

The inventive rod includes a gain medium having first and second equal length portions sharing a common optical axis and an optical rotator disposed between said first and second portions which optical rotator compensates for birefringence. In an exemplary case, the optical rotator includes first and second waveplates optically coupled to one another and oriented with respect to one another by a predetermined angle, where the first waveplate receives a polarized beam having a first state, and the second waveplate produces the polarized beam having a second state, the first and second states differing from one another by 90°. Multiple rotators can be employed to compensate strongly birefringent rods, each rotator compensating a section of a rod constructed from a plurality of equal length optical gain elements.

13 Claims, 5 Drawing Sheets

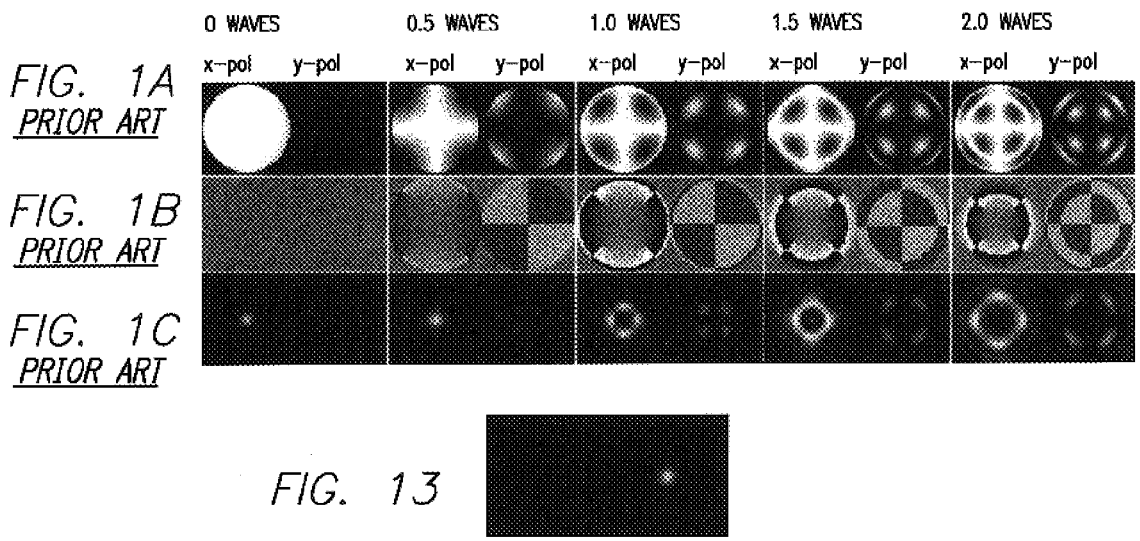

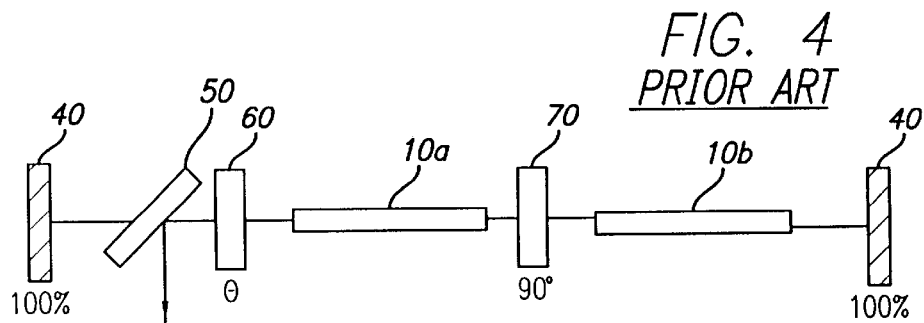
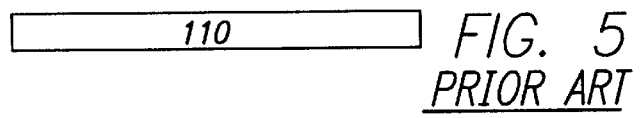
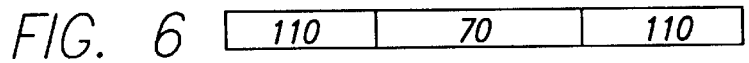
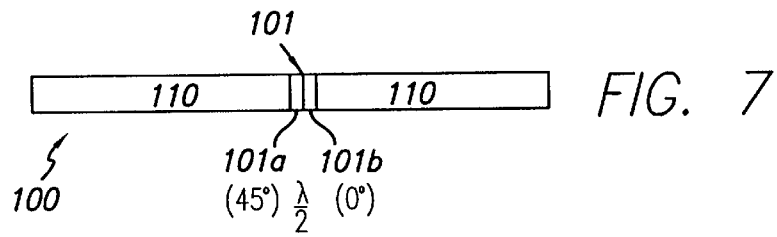
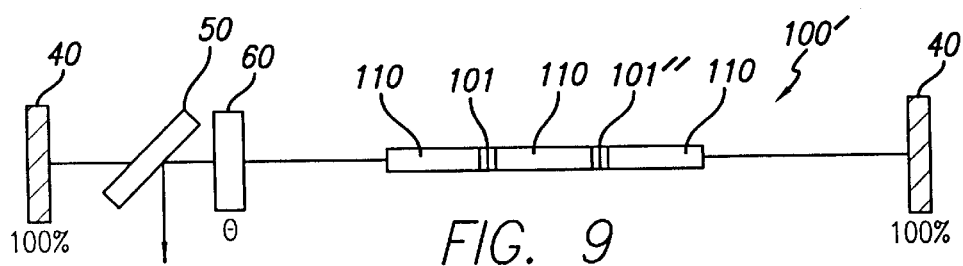
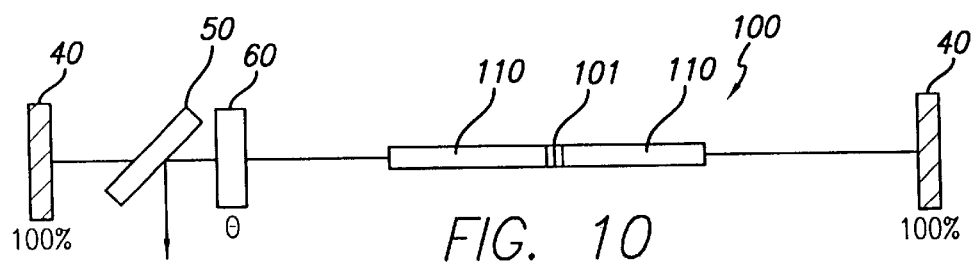

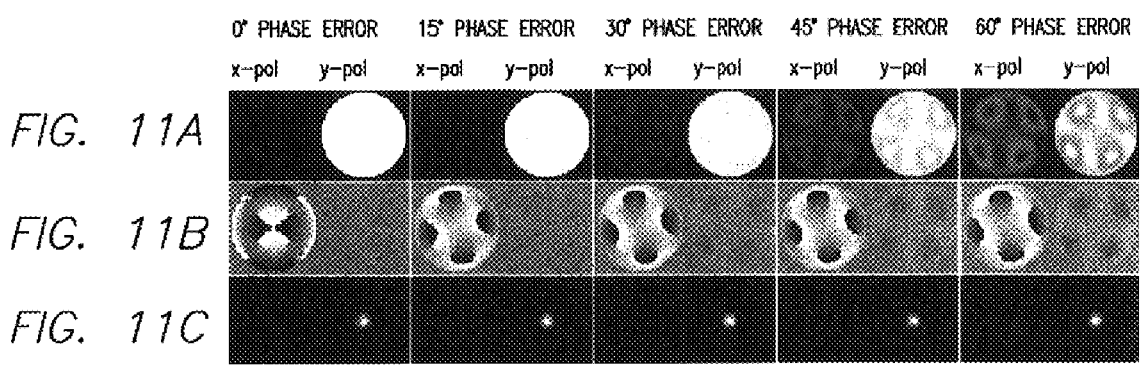
FIG. 11A
FIG. 11B
FIG. 11C
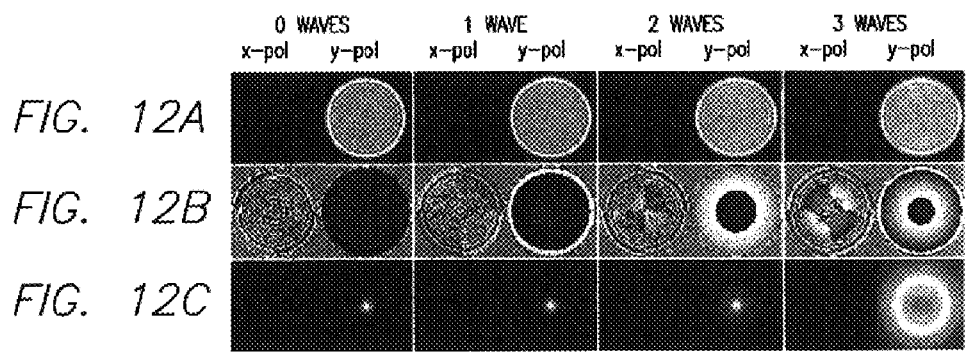
FIG. 12A
FIG. 12B
FIG. 12C

REEDER ROD

BACKGROUND OF THE INVENTION

1. Field of the Invention

The present invention relates to laser rods. More specifically, the present invention relates to thermal birefringence compensated laser rods.

2. Description of the Related Art

The beam quality and output power of a laser oscillator are severely degraded by as little as a quarter wave of thermal birefringence. The source of thermal birefringence is side cooling of a pumped cylindrical laser rod, which results in a radial temperature gradient within the rod. This is a consequence of heat conduction, where a thermal gradient is necessary for heat transfer. Solving the heat conduction equation in cylindrical coordinates shows that the temperature profile in a long, isotropic, uniformly pumped laser rod is a quadratic function of radius. Both the index of refraction and the physical length of the rod change with temperature, so that the rod becomes a thermally induced lens. The rod becomes birefringent due to differential stress in the radial and tangential directions (circular symmetry), depending on such factors as: (a) the material the rod is made from; (b) the dimensions of the rod; and (c) the heat loading of the rod. The net effect is that phase shifts for radial and tangential polarizations are different, even though both are quadratic functions of the radius, just as in a spherical lens.

Scott-Dewit compensation is a well-known method by which the thermal birefringence of a rod can be corrected, either by another rod or by the same rod. However, Scott-Dewit compensation is difficult on a chain of different diameter amplifiers because the birefringence of one amplifier rod is used to compensate another. For a single rod double pass amplifier, Scott-Dewit compensation works fairly well, but requires the use of a Faraday rotator. Vector phase conjugation works extremely well, but is complicated to implement.

Other inventions by this Applicant also assigned to Raytheon Company include: "Reeder Rotator" (Ser. No. 09/483,254, U.S. Pat. No. 6,268,962; "Reeder Compensator" (Ser. No. 09/482,376, U.S. Pat. No. 6,317,450; and "Waveplate Polarizing Rotator" (Ser. No. 09/482,378; These applications are incorporated herein by reference.

What is needed then is a mechanism for compensation of thermal birefringence effects in laser rods to improve the performance of high average power laser oscillators and amplifiers. More specifically, what is needed is a mechanism that virtually eliminates the birefringence problem for laser pump powers that would usually produce two or three waves of birefringence. It should be noted that since it takes eight times as much pump power to produce two waves of birefringence as it does to produce a quarter-wave, output power from a thermal birefringence compensated laser oscillator is also on the order of eight times higher. Thus, what is needed is a laser oscillator employing a thermal birefringence compensated laser rod to thereby ensure both good beam quality and greatly increased output power.

SUMMARY OF THE INVENTION

The need in the art is addressed by the laser rod of the present invention. The inventive laser rod includes a gain medium and an optical rotator. Preferably, the gain medium includes first and second equal length portions sharing a common optical axis while the optical rotator is disposed between the first and second portions. In the illustrative embodiment, the optical rotator includes a pair of waveplates which receive a polarized beam having a first state and outputs a polarized beam having a second state rotated 90° with respect to the first state.

Additionally, a laser apparatus providing optical gain while permitting thermal birefringence correction includes at least one optical rotator disposed between a pair of equal length optical gain elements. Preferably, the optical rotator includes a first waveplate receiving a polarized beam having a first state and generating the polarized beam having a second state, and a second waveplate oriented 45° from the first waveplate, which receives the polarized beam at the second state and produces the polarized beam having a third state, wherein the first and third states differ from one another by 90° Advantageously, multiple rotators can be employed to compensate strongly birefringent rods, each rotator compensating one pair of equal length optical gain elements.

BRIEF DESCRIPTION OF THE DRAWINGS

FIGS. 1A though 1C collectively illustrate the effects due to birefringence of various magnitudes on a single pass laser amplifier laser rod.

FIG. 4 depicts a known method of Scott-Dewit compensation of a multi-pass laser oscillator employing multiple rods.

FIG. 5 illustrates a conventional laser rod.

FIG. 6 illustrates a quartz rotator incorporated into the laser rod depicted in FIG. 5 to permit thermal birefringence compensation.

FIG. 7 illustrates a rotator incorporated into the laser rod depicted in FIG. 5 according to the present invention.

FIG. 9 illustrates a laser resonator incorporating the laser rod depicted in FIG. 7

FIG. 10 illustrates a laser resonator incorporating an alternative embodiment of the laser rod depicted in FIG. 7.

FIGS. 11A–11C collectively illustrate the output of the thermal birefringence compensated laser rod illustrated in FIG. 7 at various magnitudes of birefringence.

FIGS. 12A–12C collectively illustrate the overall effect of rod bifocusing on the output of the thermal birefringence compensated laser rod illustrated in FIG. 7 at various magnitudes of birefringence.

FIG. 13 illustrates the overall effect of wavefront correction on the output of the thermal birefringence compensated laser rod illustrated in FIG. 7 for three waves of birefringence.

DESCRIPTION OF THE INVENTION

Figure 2A:
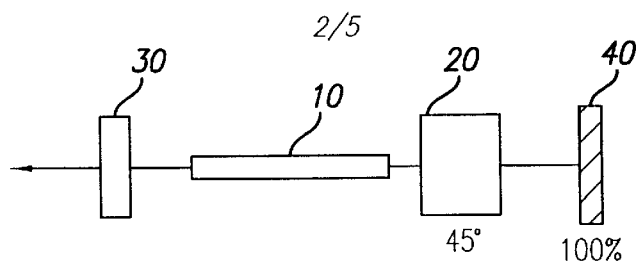
FIGS. 2A and 2B depict alternative methods of Scott-Dewit compensation of a single-pass laser oscillator.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As mentioned in the Background of the Invention, beam quality and output power of an oscillator are severely degraded by as little as a quarter wave of thermal birefringence. The source of thermal birefringence is side cooling of a pumped cylindrical laser rod, which results in a radial temperature gradient within the rod. It will be noted that this is due to heat conduction, where a thermal gradient is necessary for heat transfer. Solving the heat conduction equation in cylindrical coordinates shows that the temperature profile in a long, isotropic, uniformly pumped laser rod is a quadratic function of radius. Both the index of refraction and the physical length of the rod change with temperature, so that the rod becomes a thermally induced lens.

Stated another way, the rod becomes birefringent due to differential stress in the radial and tangential directions (circular symmetry), depending on such factors as: (a) the material the rod is made from; (b) the dimensions of the rod; and (c) the heat loading of the rod. The net effect is that phase shifts for radial and tangential polarizations are different, even though both are quadratic functions of the radius, just as in a spherical lens. Thus, rod birefringence can be described by two numbers, the radial and tangential focal lengths, both of which are presented immediately below.

$$\frac{l}{f_r} = \frac{P_{heat}}{KA}\left[\frac{1}{2}\frac{dn}{dT} + \alpha C_r n^3 + \frac{\alpha d(n-1)}{2L}\right] \text{ and} \quad (1)$$

$$\frac{l}{f_\varphi} = \frac{P_{heat}}{KA}\left[\frac{1}{2}\frac{dn}{dT} + \alpha C_\varphi n^3 + \frac{\alpha d(n-1)}{2L}\right] \quad (2)$$

where the rod parameters are diameter (d), cross sectional area (A), length (L), refractive index (n), temperature derivative of index (dn/dT), linear expansion coefficient ($\alpha$), thermal conductivity (K), elastooptical coefficients (Cr and $C^\Phi$), and the total heat load ($P_{heat}$, watts). For YAG lasers, the medium parameters are n=1.82, dn/dT=8.9×10$^{-6}$/° C., K=10 W/m° C., $C_r$=17×10$^{-3}$, and $C_\phi$=−3×10$^{-3}$. Thus, for YAG laser radial optical power is greater than the tangential optical power.

It will be appreciated that the calculation of the effects of the differential phase shift between the radial and tangential components of electric field are straightforward. Such calculations simply involve finding the radial and tangential components of the incident optical field(s), introducing the proper phase shift on each component, and summing the components up to get the resultant field. This implies that the rod is optically thin, i.e., diffraction effects within the rod are negligible (for now).

The Jones matrix of the thermally birefringence rod is:

$$J_{rod} = \begin{pmatrix} \cos\theta & -\sin\theta \\ \sin\theta & \cos\theta \end{pmatrix}\begin{pmatrix} e^{i\varphi_r} & 0 \\ 0 & e^{i\varphi_r} \end{pmatrix}\begin{pmatrix} \cos\theta & \sin\theta \\ -\sin\theta & \cos\theta \end{pmatrix}, \quad (3)$$

where the rotations to and from the principle axes of the thermal birefringence are included. The respective radial and tangential phase shifts are $$\varphi_r = -\frac{\pi r^2}{\lambda f_r} \quad (4)$$

$$\varphi_\phi = -\frac{\pi r^2}{\lambda f_\phi} \quad (5)$$

Since the calculations assume $e^{-i\omega t}$ time dependence, wavefront distortion decreases from center-to-edge for a converging beam, and thus, the minus signs on the phases. It should also be noted that the rod's Jones matrix is not a constant, but varies with r and θ. It should be mentioned that, in most of the numerical computations that follow, the average lensing of the rod is compensated.

$$\frac{1}{f_{ave}} = \frac{1}{2}\left(\frac{1}{f_r} + \frac{1}{f_\phi}\right). \quad (6)$$

The differential lensing power between the radial and tangential components is also given in terms of waves, to make the results more general. A birefringent distortion of m waves corresponds to an optical power difference of:

$$\frac{1}{f_r} - \frac{1}{f_\phi} = \frac{8m\lambda}{d^2}. \quad (7)$$

The effect of a thermally birefringent rod on x-polarized light, for different magnitudes of birefringence, can best be understood by referring to FIGS. 1A–1C, wherein the FIG. 1A shows the near field intensity distribution for different magnitudes of birefringence, and FIG. 1B shows near field phase effects for different magnitudes of birefringence. Is should be noted that in FIG. 1B, black corresponds to a phase of −π, middle gray corresponds to a phase angle of zero, and white corresponds to a phase angle of π. It will also be noted that black and white thus correspond to the same phase, there being a rollover every 2π in phase. FIG. 1C shows far field intensity, which provides the reader with a sense of how the near field phase affects the far field beam shape.

It will be noted that the phase distortion on the x-polarized field is saddle shaped. This is because the average lensing of the rod has been subtracted (or corrected). On the horizontal bar of the ring and brush, the x-field is radial, while on the vertical bar, it is tangential. Since the calculations employ $e^{-i\omega t}$ time dependence, wavefront distortion decreases from center-to-edge for a converging beam. For radial polarization, the phase decreases towards the edge and, thus, there is a net positive lens. The reverse is the case for the tangential polarization, i.e., there is a net negative lens. Thus, the radial focal length is shorter than the tangential focal length in the figures below, as it should be for YAG.

There are a number of things to note. First, the x and y polarizations are additive, thereby providing a total intensity equal to that of the input, i.e., there is no loss. Second, the near field intensity patterns are complementary, a result that is also based on energy conservation. It should be also noted, although it is not shown here, that a double pass through the rod, via a mirror reflection, results in twice as many waves of birefringent distortion as those generated for the single pass case.

As mentioned above, Scott-Dewit compensation is a well-known method by which the thermal birefringence of a rod can be corrected, either by another rod or by the same rod. If two rods are used, then a 90° rotator is placed between the rods. When only one rod is used, then the polarization state of the beam is rotated 90° with a Faraday rotator between rod passes. Thus, a polarization state that was radial on the first pass is tangential on the second, and vice versa. The total phase shift is the sum of the radial and the tangential for every point on the rod, and no depolarization occurs, except for the total 90° rotation. It will be appreciated that lenses must be used in the Faraday arm of the resonator to properly image the rod onto itself, without adding additional wave curvature.

Figure 2B:
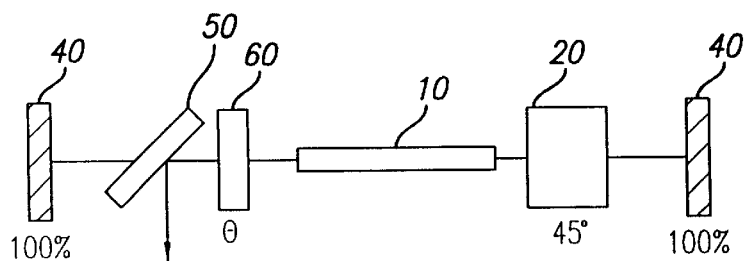

How Scott-Dewit compensation would look in a laser oscillator will now be considered, as it will point out some of the problems with use of this compensation technique in a laser resonator. One could imagine the final resonator being constructed as illustrated in FIGS. 2A and 2B. The resonator according to FIG. 2A includes a laser rod 10 and a Faraday rotator 20 disposed between an outcoupler 30 and a total reflector 40. In contrast, the resonator illustrated in FIG. 2B is bounded by a pair of total reflectors 40 defining an optical path along which a polarization beam splitter 50, a quarter waveplate 60, a rod 10, and a Faraday rotator 20 (arranged in that order) are disposed. It should be mentioned that the various components are marked to indicate relative angular rotation, where appropriate. However, both of these resonators have problems.

The resonator illustrated in FIG. 2A has the problem that the output changes between orthogonal polarization states every roundtrip time. In contrast, the resonator illustrated in FIG. 2B has the problem that the outcoupling is always 100%, independent of the waveplate orientation. Outcoupling can only be varied by putting the waveplate between the Faraday rotator 20 and the end reflector 40, but this will degrade the birefringence correction.

Figure 3A:
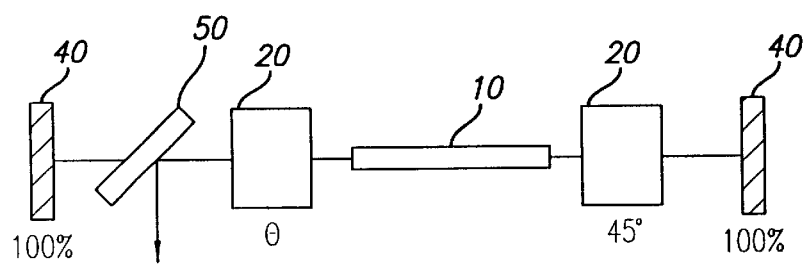
FIGS. 3A and 3B depict alternative methods of Scott-Dewit compensation of a multi-pass laser oscillator.
Figure 3B:
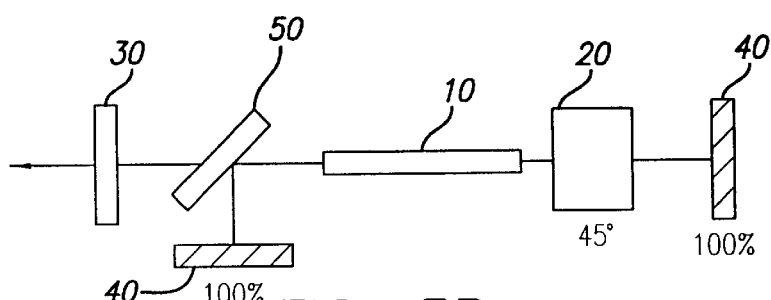

There are several ways around these problems. One is to use a Faraday rotator on both sides of the rod, as illustrated in FIG. 3A. The Faraday rotator 20 on the right side of the resonator is for Scott-Dewit birefringence compensation, the Faraday rotator 20 on the left of the resonator is used to control the outcoupling fraction of the resonator. Unfortunately, as previously mentioned, this requires two Faraday rotators. Another way around the problem associated with FIG. 3A is to use the four pass resonator illustrated in FIG. 3B. However, this results in higher flux levels within the resonator. In addition, an uncompensated birefringence on the first double pass contributes to the output, possibly degrading the output beam quality.

It should be noted that when two rods are used, then the resonator would look like the combination illustrated in FIG. 4, where the end mirrors 40 can be any standard end reflector prisms (which would allow one to eliminate the waveplate, if desired). The resonator illustrated in FIG. 4 includes rods 10a, 10b and a rotator 70, e.g., an active quartz rotator. Additionally, the resonator of FIG. 4 includes a quarter waveplate 60 and an outcoupling element, e.g., polarization beam splitter 50.

In operation, when the thermal load is different for each rod 10a, 10b (or if the rods are different sizes), then the birefringent compensation is less than perfect. For example, when rod 10a has $m^1$ fringes and rod 10b has $m_2$ fringes of birefringence, then the net uncorrected birefringence is $(m_1-m_2)$ fringes. When the difference in rod birefringence is less than about 0.25 waves, then the compensation is fairly good. This would correspond to a 13% pump difference if the rods 10a, 10b are pumped to about two (2) fringes of birefringence. Another compensation error occurs if rod images are decentered on the physical rod.

The two rod configuration depicted in FIG. 4 is compatible with almost any type of resonator that can be built around the rods. For example, the resonator can be flat-flat with a partially reflective outcoupler or a polarization outcoupled resonator with flat mirrors or prisms.

High power amplifiers have been compensated using the Scott-Dewit compensation scheme or via vector phase conjugation. Scott-Dewit compensation is difficult on a chain of different diameter amplifiers because, as discussed above, the birefringence of one amplifier rod is used to compensate another. For a single rod double pass amplifier, Scott-Dewit compensation works fairly well, but requires the use of a Faraday rotator. Vector phase conjugation work extremely well, but is complicated to implement.

As mentioned with respect to FIG. 4, while it is possible to have two laser rods in a single resonator, it is not desirable to have two laser rods in a resonator if only one would do.

FIG. 5 illustrates a conventional laser rod, which consists entirely of a gain medium section 110. FIG. 6 illustrates a proposed rod configuration, which is a somewhat more complicated design than that illustrated in FIG. 5, but which includes a 90° quartz rotator 70 (assuming quartz can be diffusion bonded to YAG) to compensate for thermal birefringence. It will be noted that small pieces of white YAG (not shown) may be necessary between the quartz rod 70 and the doped YAG sections 110, in order to provide a small degree of thermal isolation, if the temperature in either of the doped regions 110 is hot enough to affect the optical activity of the quartz rotator element 70.

There are several problems with the YAG/Quartz composite rod that must be considered. First, the length of quartz necessary to get 90° of rotation at an operating wavelength of 1.1 μm is on the order of 15 mm. This means that the pump cavity must be 50% longer, for a 30 mm length of gain medium, while the average absorption of the rod is 33% smaller, resulting in a less efficient pump cavity. Second, the Fresnel reflection from the quartz/YAG interface is 1.3% and, thus, an additional round trip loss of 5.2% (0–10.4% if double reflection behaves as an etalon). It may be best to include an etalon, e.g., in the resonator illustrated in FIG. 4, since one might be necessary in the resonator anyway. This requires that the quartz faces be made almost perfectly parallel to each other. Rod bending in the pump cavity would then be of concern.

Thus, as mentioned above, what is needed is a mechanism for compensation for thermal birefringence effects in laser rods to improve the performance of high average power laser oscillators and amplifiers. More specifically, what is needed is a mechanism which virtually eliminates the birefringence problem for laser pump powers that would usually produce two or three waves of birefringence. It should be noted that since it takes eight times as much pump power to produce two waves of birefringence as it does to produce a quarter wave, output power from a thermal birefringence compensated laser oscillator is also on the order of eight times higher. Thus, what is needed is a laser oscillator employing a thermal birefringence compensated laser rod to thereby ensure both good beam quality and greatly increased output power.

The need in the art is addressed by the laser rod with gain medium and optical rotator of the present invention. Preferably, the gain medium includes first and second equal length portions sharing a common optical axis while the optical rotator is disposed between the first and second portions. Advantageously, the optical rotator includes a pair of waveplates which receive a polarized beam having a first state and outputs a polarized beam having a second state rotated 90° with respect to the first state.

Additionally, a laser apparatus providing optical gain while permitting thermal birefringence correction includes at least one optical rotator disposed between a pair of equal length optical gain elements. Preferably, the optical rotator includes a first waveplate receiving a polarized beam having a first state and generating the polarized beam having a second state, and a second waveplate oriented 45° from the first waveplate, which receives the polarized beam at the second state and produces the polarized beam having a third state, wherein the first and third states differ from one another by 90°. Advantageously, multiple rotators can be employed to compensate strongly birefringent rods, each rotator compensating a section of a rod constructed from a plurality of equal length optical gain elements.

A first preferred embodiment of a Reeder Rod 100 according to the present invention is depicted in FIG. 7. The thermal birefringence compensated laser rod (hereafter Reeder Rod 100) according to the present invention is a composite structure that consists of gain elements sandwiched around a Reeder Rotator 101 (See Attorney Docket No. R98093, which is commonly assigned and which is incorporated herein by reference for all purposes). As will be discussed in greater detail below, this structure corrects the birefringence of the laser rod illustrated in FIG. 5, enabling greatly improved performance of both laser oscillators and amplifiers.

Figure 8A:
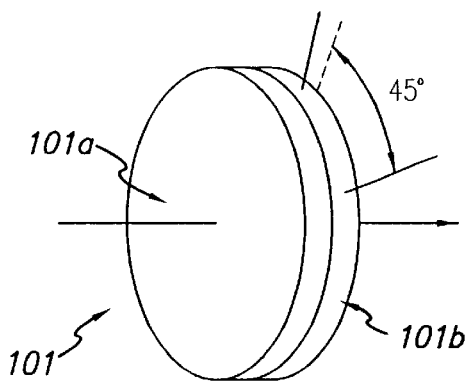
FIGS. 8A–8E illustrate alternative embodiments of the optical rotator incorporated into the "Reeder Rod" according to the present invention.
Figure 8B:
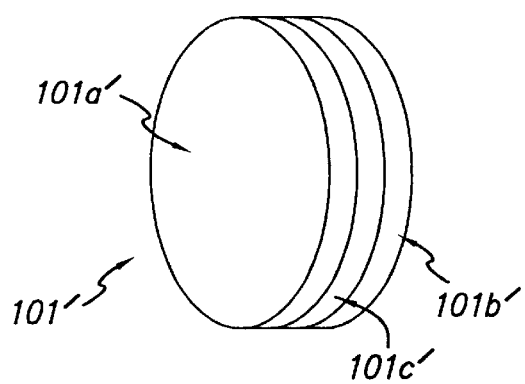

FIG. 8A is a diagram illustrative of an optical rotator, i.e., a Reeder Rotator, 101, incorporated into the Reeder Rod 100 constructed in accordance with the teachings of the present invention. In the illustrative embodiment, the Reeder Rotator 101 is designed to rotate any input polarization state by 90°. Hence, the rotator 101 is the waveplate equivalent of a 90° optically active rotator (such as the quartz rotator 70 illustrated in FIG. 6). As illustrated in FIG. 8A, the Reeder Rotator 101 is formed from two half waveplates 101a and 101b oriented 45° apart. It should be noted that the optical rotator employed in the Reeder Rod 100 according to the present invention can be formed from a single, monolithic structure without departing from the scope of the present teachings. Alternatively, the Reeder Rotator 101', can be formed from two half waveplates 101a', 101b', oriented 45° apart and separated by an optically passive material, i.e., an optical spacer 101c', where optical power through the Reeder Rotator 101 is a consideration, as illustrated in FIG. 8B. Stated another way, FIG. 8B is an illustration of an alternate configuration of the optical rotator 101' employed in the Reeder Rod 100 according to the present invention. The Reeder Rotator 101' of FIG. 8B is formed from two half waveplates 101a', 101b'oriented 45° apart and separated from one another by an optical spacer 101c' e.g., a section of white YAG. It should be noted that the Reeder Rotator 101' is preferable to the Reeder Rotator 101 when optical power through the rotator is a consideration. It should also be noted that both Reeder Rotator 101' and Reeder Rotator 101 rotate any input polarization state by 90°.

Figure 8C:
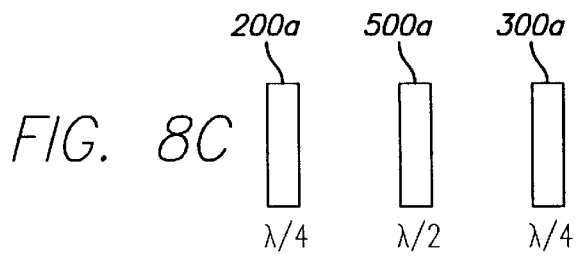
Figure 8D:
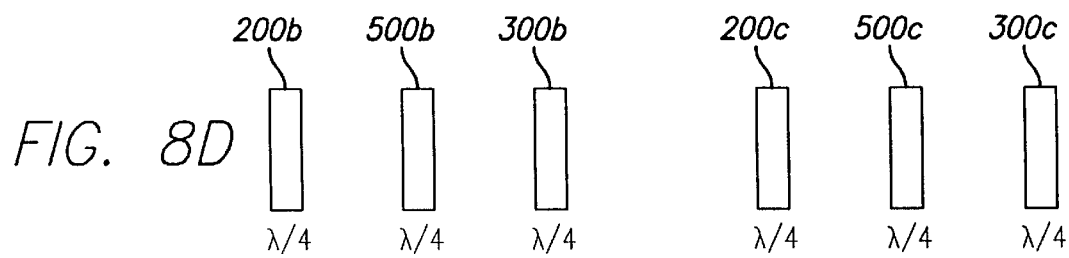
Figure 8E:
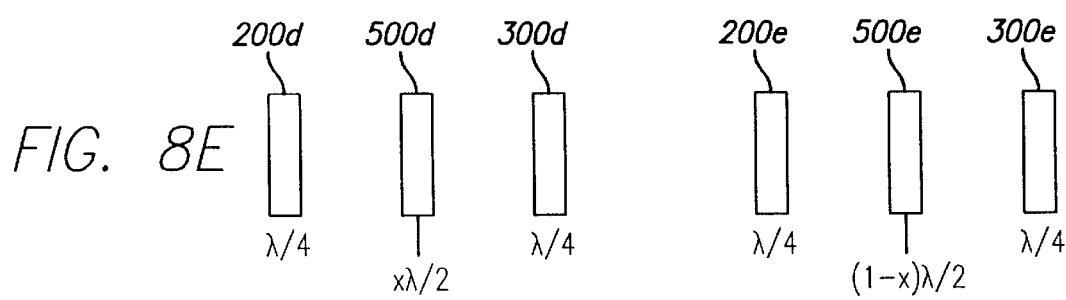

It will be appreciated that other variations and alternative configurations are possible, as shown in FIGS. 8C–8E (see Attorney Docket No. PD R98109, the teachings of which are incorporated herein by reference), which collectively illustrate a waveplate rotator that consists of either three waveplates or several groups of three waveplates. In an exemplary case, the outer two waveplates, which are generally denoted 200n and 300n, are quarter waveplates, while the inner waveplate, generally denoted 500n, has a phase difference that equals twice the desired rotation angle, i.e., 90°. Although an infinite number of variations are possible, it will also be appreciated that most of these variations require too many elements to make these variations practical.

Referring again to FIG. 7, the Reeder Rod 100 includes first and second equal length optical gain sections 110 disposed on either side of a Reeder Rotator 101 made of sapphire. In an exemplary case, the optical gain medium is Nd:YAG, although other materials such as Yb:YAG advantageously can be used. The Reeder Rod 100 advantageously can, but need not, include end sections (not shown) fabricated from materials lacking optical gain properties, e.g., white YAG. Advantageously, the monolithic rod structure 100 can be made via diffusion bonding. A typical application of the Reeder Rod 100 according to the present invention is illustrated in FIG. 9.

The correction scheme employed in Reeder Rod 100 is the well-known Scott-Dewit compensation technique, which was discussed above in great detail. One clear difference between the laser rod depicted in FIG. 6 and the Reeder Rod 100 illustrated in FIG. 7 is that Reeder Rotator 100 enables one to make an extremely thin 90° rotator. Advantageously, the Reeder Rotator 101 can be constructed of a material that can be diffusion bonded to the dissimilar gain medium. Thus, a single rod can be built that has its thermal birefringence corrected. When YAG (Nd or Yb doped, for example) is the substrate for the gain medium, then sapphire advantageously can be employed as the material for the Reeder Rotator 101 It will be appreciated that sapphire is a uniaxial material that can be diffusion bonded to YAG; uniaxial and biaxial materials advantageously can be employed in fabrication the Reeder Rotator 101 employed in Reeder Rod 100 In addition, because of sapphire's relatively close index match to YAG, reflection from the diffusion bonded interface is very small. It will be appreciated that another gain medium would utilize another rotator medium.

With respect to the exemplary configuration of the thermal birefringence compensated laser rod, i.e., the Reeder Rod 100 illustrated in FIG. 7, the refractive index of sapphire is about 1.75, with an ordinary minus extraordinary index difference of $\Delta n=0.0078$. A zero order half waveplate constructed from this material advantageously would be only 66 $\mu$m thick. It will be appreciated that the affect of two such waveplates on the rod length is negligible, so the pump cavity does not need to be redesigned. It will also be noted that the Fresnel reflection from the sapphire/YAG boundary is only 0.04%, which is not enough of a problem to require corrective measures. The waveplates 101a, 101b could be tilted if this is an issue. In addition, the orientation (rotational angle) of the final rod in the resonator would not be an issue because the Reeder Rotator 101 works irrespective of how it is oriented.

It should also be mentioned that when the rod temperature has a large effect on the sapphire, it would be possible to make an optical spacer (not shown) out of c-cut sapphire or white YAG to reduce the temperature of the sapphire waveplates 101a, 101b. This is probably not a problem if the half waveplates 101a, 101b of the Reeder Rotator 101 are zero order half waveplates.

It should be noted that the Reeder Rod 100 according to the present invention advantageously can be used on any laser program that uses a strongly pumped laser rod that exhibits more than a quarter wave of thermal birefringence. Moreover, when the optical power being pumped through Reeder Rod 100 exceeds a predetermined magnitude (or when the resonator requires a predetermined polarization), the Reeder Rod advantageously can be configured as illustrated in FIG. 10. The Reeder Rod 100' advantageously includes first and second Reeder Rotators 101, 101 " disposed between three sections 110 of optical gain material, the center section being twice the length of either end section.

FIGS. 11A–11C illustrate the effects of waveplate phase error (deviation from 180°) on birefringence correction for a thermal birefringence compensated laser rod according to the present invention that is pumped hard enough to have two fringes of thermal birefringence, one on each half of the rod. FIGS. 11A–11C clearly indicate that birefringence correction is very good even if the phase error is on the order of 15°. It should be noted that for birefringence correction, all that is required between the rod halves is a 90° rotator. As has been indicated, this can be done with a non-reciprocal Faraday rotator, an optically active rotator like quartz, or the Reeder Rotator 101

One other issue with Scott-Dewit compensation is rod bifocusing. Since the radial and tangential focal lengths of a thermally birefringent rod are not the same, which is what produces the birefringence, the path of rays through the rod on the second compensating pass is not exactly the same as on the first pass. Thus, the compensation is less than perfect. This effect is called rod bifocusing, and has been neglected up to this point.

FIGS. 12A–12C show the effects of rod bifocusing on Scott-Dewit compensation. The average lensing of a rod is compensated by a lens on either side of the rod. The rods are butted up against each other with a 90° rotator (infinitely thin) between them. The rods are 2×20 mm in dimension with an index of 1.82 (YAG). Also, the difference between radial and tangential focal lengths is 18%.

It should be noted that the error in correction is mostly phase, due to the fact that the rod does not look like a thin lens when its focal length is short, i.e., the rod is a stronger positive lens and, thus, the output is somewhat converging, enough to give the poor far field pattern. If the wavefront is corrected at output, then the far field looks like FIG. 13 for the 3 waves of birefringence, i.e., the worst case shown.

Thus, rod bifocusing is not a significant issue for up to three waves of distortion. It should also be noted that the above pictures have been reduced in size from 128×256 pixels to 64×128 pixels for display here, and that the 3 waves of birefringence case was checked at a resolution of 256× 512 with no observable change.

In summary, a composite rod structure employing a Reeder Rotator between gain halves provides an optimal solution to thermal birefringence compensation. Such a device is the thermal birefringence compensated laser rod, i.e., the so-called Reeder Rod.

The Reeder Rod according to the present invention improves the performance of high average power laser oscillators and amplifiers. As previously mentioned, the beam quality and output power of an oscillator are severely degraded by as little as a quarter wave of thermal birefringence. This inventive thermal birefringence compensated laser rod virtually eliminates the birefringence problem for laser pump powers that would usually produce two or three waves of birefringence. As mentioned above, it takes eight times as much pump power to produce two waves of birefringence as it does to produce a quarter wave, so output power from the oscillator is also on the order of eight times higher. Thus, good beam quality and greatly increased output power can be obtained from a resonator employing the novel Reeder Rod.

As previously mentioned, high power amplifiers have been compensated with the Scott-Dewit compensation scheme or via vector phase conjugation. Scott-Dewit compensation is difficult on a chain of different diameter amplifiers because the birefringence of one amplifier rod is used to compensate another. For a single rod double pass amplifier, Scott-Dewit compensation works fairly well, but requires the use of a Faraday rotator. Vector phase conjugation work extremely well, but is complicated to implement. The Reeder Rod according to the present invention greatly improves amplifier performance for any amplifier configuration. Even if phase conjugation is required to correct other wavefront distortions, phase conjugation advantageously can be implemented using a scalar phase conjugator, which is quite a bit simpler to construct and operate than a vector conjugator. In short, the thermal birefringence compensated laser rod according to the present invention advantageously can be used for any laser application that uses a strongly pumped laser rod that exhibits more than a quarter wave of thermal birefringence.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A laser rod providing optical gain while permitting thermal birefringence correction, comprising:

a composite structure including:

a first optical gain medium;

a second optical gain medium; and an optical rotator comprising at least first and second waveplates optically coupled to one another and oriented with respect to one another by a predetermined angle; wherein:

said first waveplate receives a polarized beam having a first state;

second waveplate produces the polarized beam having a second state, said first and second states differing from one another by 90°; and said first optical gain medium, said optical rotator, and said second optical gain medium are arranged in the recited order along a common optical axis, said first and said second optical gain media comprising Yb:YAG or Nd:YAG and said optical rotator comprises sapphire.

2. The invention of claim 1, wherein said first optical gain medium and said second optical gain medium are of equal length.

3. The invention of claim 1, wherein:

said optical rotator comprises a first optical rotator and said laser rod further comprises:

a third optical gain medium; and a second optical rotator, comprising at least third and fourth waveplates optically coupled to one another and oriented with respect to one another by a predetermined angle;

said third waveplate receiving a polarized beam having said second state; and said fourth waveplate producing the polarized beam having a third state, said second and third states differing from one another by 90°;

said first optical gain medium, said first optical rotator, said second optical gain medium, said second optical rotator, and said third optical gain medium being arranged in the recited order along a common optical axis; and said first and said third optical gain medium being of equal length and the length of said second optical gain medium being twice that of said first optical gain medium.

4. The invention of claim 3 wherein said first, said second and said third optical gain media comprise Yb:YAG and wherein said first and said second optical rotators comprise sapphire.

5. The invention of claim 3 wherein said first, said second and said third optical gain media comprise Nd:YAG and wherein said first and said second optical rotators comprise sapphire.

6. The invention of claim 1, wherein said first and said second waveplates are formed in a monolithic element.

7. A laser rod providing optical gain while permitting thermal birefringence correction, comprising:
   a composite structure including:
   a first optical gain medium;
   a second optical gain medium; and
   an optical rotator comprising:
      a first waveplate receiving a polarized beam having a first state and generating the polarized beam having a second state; and
      a second waveplate oriented 45° from said first waveplate, which receives the polarized beam at said second state and produces the polarized beam having a third state; wherein:
   said first and third states differ from one another by 90°; and
   said first optical gain medium, said optical rotator, and said second optical gain medium are arranged in the recited order along a common optical axis.
   said first and said second optical gain media comprising Yb:YAG or Nd:YAG and said optical rotator comprises sapphire.

8. The invention of claim 7 wherein said first optical gain medium and said second optical gain medium are of equal length.

9. The invention of claim 7 wherein:
   said optical rotator comprises a first optical rotator;
   said laser rod further comprises:
      a third optical gain medium; and
      a second optical rotator, comprising:
         a third waveplate receiving a polarized beam having a fourth state and generating the polarized beam having a fifth state; and
         a fourth waveplate oriented 45° from said third waveplate, which receives the polarized beam at said fifth state and produces the polarized beam having a sixth state;
   said fourth and sixth states differ from one another by 90°;
   said first optical gain medium, said first optical rotator, said second optical gain medium, said second optical rotator, and said third optical gain medium are arranged in the recited order along a common optical axis; and
   said first and said third optical gain medium are of equal length and the length of said second optical gain medium is twice that of said first optical gain medium.

10. The invention of claim 9 wherein said first, said second and said third optical gain media comprise Nd:YAG and wherein said first and said second optical rotators comprise sapphire.

11. The invention of claim 9 wherein said first, said second and said third optical gain media comprise Yb:YAG and wherein said first and said second optical rotators comprise sapphire.

12. The invention of claim 7 wherein said first and said second half waveplates are physically coupled to one another.

13. The invention of claim 7 wherein said first and said second half waveplates are physically coupled to one another by an optical spacer.

* * * * *